Dec. 11, 1962 C. M. BLISS 3,067,500
COIL SPRING REMOVAL TOOL

Filed Aug. 13, 1959 2 Sheets-Sheet 1

INVENTOR.
Carl M. Bliss
BY
D. D. McGraw
ATTORNEY

Dec. 11, 1962 C. M. BLISS 3,067,500
COIL SPRING REMOVAL TOOL
Filed Aug. 13, 1959 2 Sheets-Sheet 2

INVENTOR.
Carl M. Bliss
BY
O. D. McGraw
ATTORNEY

United States Patent Office 3,067,500
Patented Dec. 11, 1962

3,067,500
COIL SPRING REMOVAL TOOL
Carl M. Bliss, Oak Park, Mich., assignor to General Motors Corporation, Detroit, Mich., a corporation of Delaware
Filed Aug. 13, 1959, Ser. No. 833,634
3 Claims. (Cl. 29—227)

The invention relates to a tool for removing coil springs and more particularly to a tool which may be used to compress the coil springs usually used in automotive vehicle suspension systems. When the springs are compressed by tools of this nature they may be readily removed.

A tool embodying the invention preferably includes a shaft having a threaded section with a rotatable and pivotable spring hook mechanism formed at one end so that the shaft can be extended into the coil spring and the hook will engage opposite sides of a spring convolution. A pivotable support member is received about the shaft and a nut is threaded on the shaft so that the pivotable support member may be forced toward the hook mechanism as the shaft is rotated and threaded through the nut. This will compress the spring. The pivotable support member will maintain full engagement with either the lower end of the spring or the control arm providing the spring seat. The pivotable hook will likewise maintain full engagement with the spring convolution during the entire compression operation.

Figure 1:
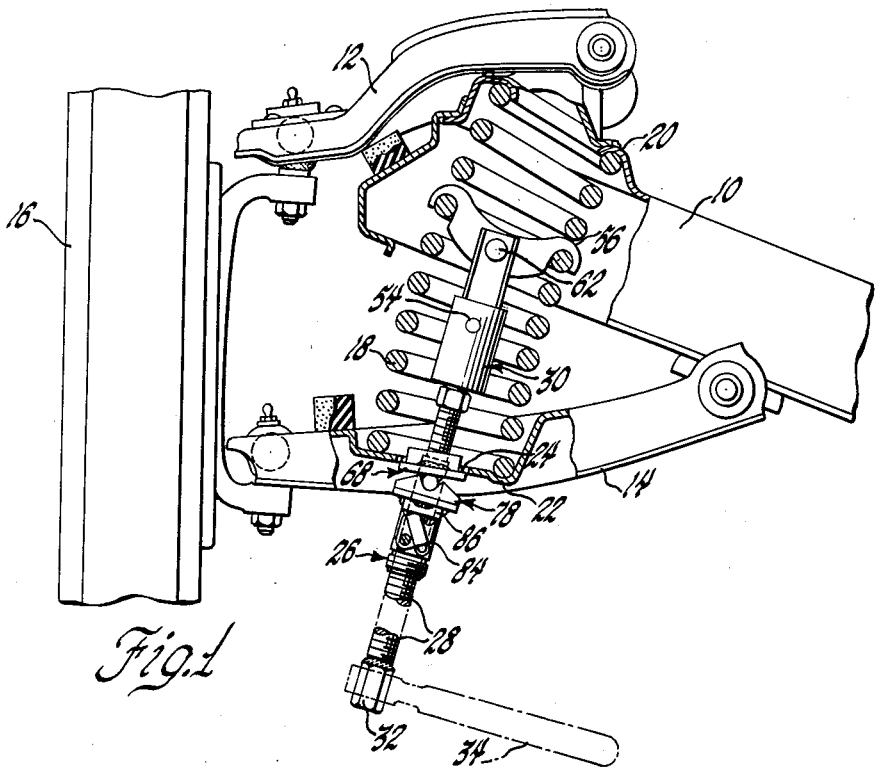
FIGURE 1 is a view of a tool embodying the invention in position on a vehicle coil spring suspension system.

The tool is illustrated in FIGURE 1 in the installed position immediately prior to compression of the coil spring. The vehicle suspension system illustrated includes a frame cross member 10 to which an upper control arm 12 and a lower control arm 14 are pivotably attached in the well known manner. The wheel 16 is secured to the outer ends of the control arms in any suitable manner. The coil spring 18 extends between the frame cross member 10 and the lower control arm 14. An upper spring seat 20 is provided in the cross member 10 and a lower spring seat 22 is provided in the lower control arm 14. The spring seat 22 is normally provided with an aperture 24 substantially in axial alignment with the axis of the spring 18. The tool 26 which embodies the invention is extended through this aperture into the position shown.

Figure 3:
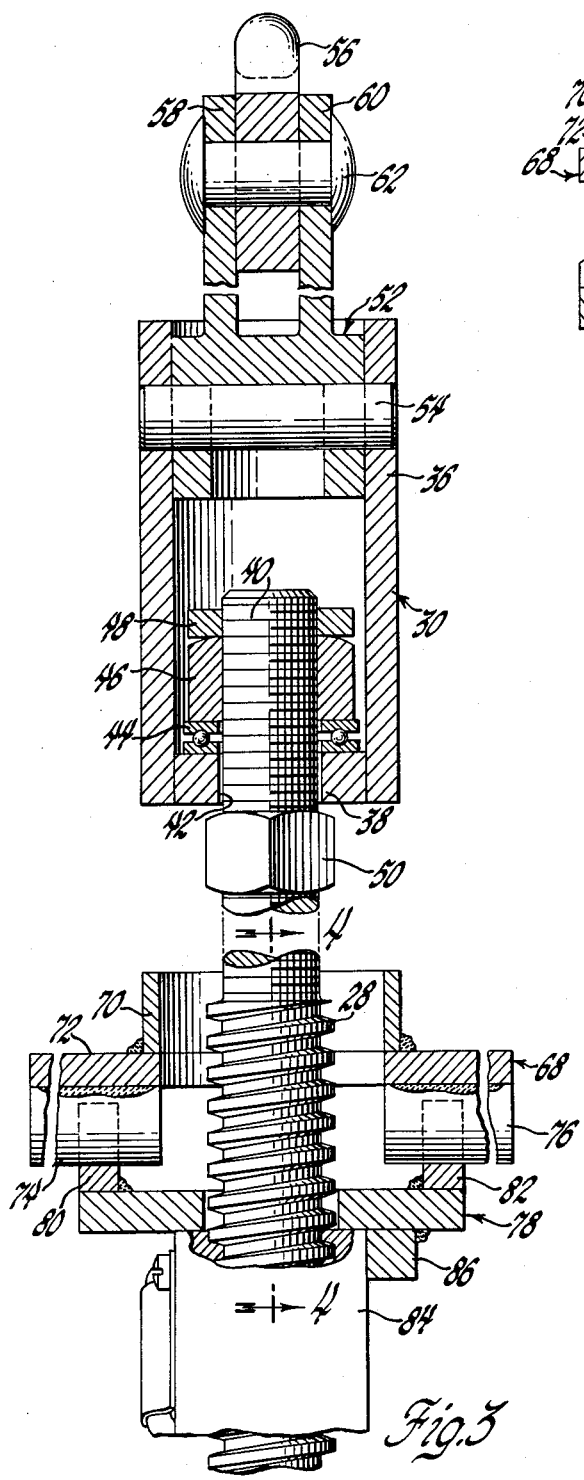
FIGURE 3 is a view of the tool of FIGURE 1 having parts broken away and in section.

The tool 26 includes a threaded shaft 28 which is connected at one end to the bearing seat and collar 30 and has a tool engaging end 32 formed to receive any suitable turning tool such as the wrench 34. Shaft or bolt 28 is rotatably secured to the collar 30 as is best illustrated in FIGURE 3. The collar may be formed of a cylindrical member 36 with an annular plug section 38 closing one end thereof. The end 40 of shaft 28 extends through the plug aperture 42. A suitable thrust bearing 44 is received within the collar 30 and about shaft 28. A bearing and shaft retaining nut 46 may be threaded on the shaft end 40 and engage the bearing 44. Nut 46 may be locked in place in any suitable manner such as by the use of a lock pin or, as illustrated, with the lock nut 48. A retaining nut 50 is threaded on the end 40 of shaft 28 before the shaft is installed in the collar and provides an adjustment whereby the collar 30 is held in approximately the same longitudinal position on the shaft at all times.

Figure 2:
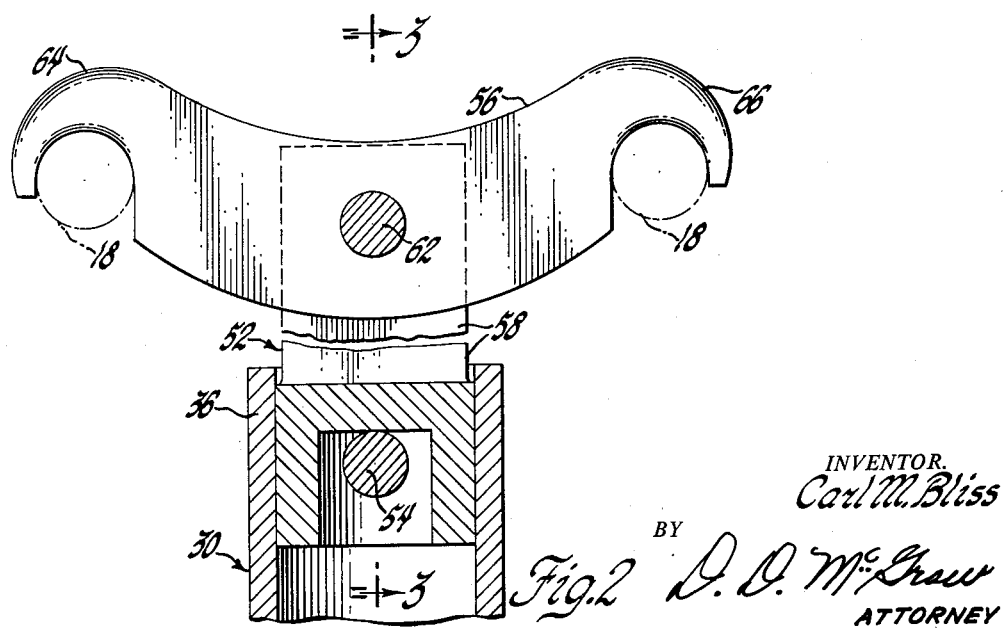
FIGURE 2 is a section view of the hooked portion of the tool of FIGURE 1 with parts broken away and in section.
Figure 4:
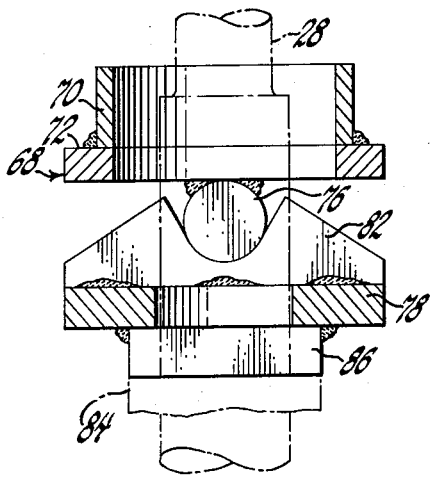
FIGURE 4 is a view of a portion of the tool taken in the direction of arrows 4—4 of FIGURE 3 and having parts broken away and in section.

A clevis 52 is secured into the other end of the collar 30 by cross pin 54. The spring hook 56 is received between the clevis forks 58 and 60 and is pivotably mounted therein by suitable fastening means such as the rivet 62. The hook is shown in detail in FIGURE 2. It is formed with hooked ends 64 and 66 so that the hooks will receive a convolution of the spring 18. The hook 56 is preferably provided with an arcuately shaped body so that it may readily pivot about rivet 62. The pivoting action permitted hook 56 is of advantage during compression of the spring as will be explained.

An apertured support member 68 is received about shaft 28 between the nut 50 and the shaft end 32. This member preferably is provided with an aperture which is substantially greater than the outer diameter of threaded shaft 28. It may have a section 70 which will fit within the aperture 24 of the lower control arm so as to prevent the tool from slipping while in use. The face 72 of the support member engages the lower surface of the spring seat 22 and will readily align itself with that surface since the support member 68 is loosely received on shaft 28. In order to facilitate that alignment, a support member 68 has pivot rollers 74 and 76 secured on the side thereof opposite section 70 and in axial alignment with each other so that their common axis is substantially in a plane through which the axis of the shaft 28 extends. A base plate 78 is received about shaft 28 and is provided with a pair of roller supports 80 and 82 in which rollers 74 and 76 are received so that the support member 68 may pivot about the common axis of the rollers. A nut 84 is threadedly received on shaft 28 adjacent base plate 78 and is normally in compressive engagement with the plate. The nut preferably has a flat surface which engages the nut retainer 86 on the lower side of base plate 78 so that the nut will not turn relative to the base plate. The nut is preferably constructed with a recirculating ball thread in order to reduce the thread friction. A thread of this nature in combination with the bearing 44 permits the tool to be used with a minimum amount of effort.

In using the tool the operator may pivot the hook 56 to its closest point of alignment with the axis of shaft 28 and extend the hook through the aperature 24 until it reaches one of the upper convolutions of spring 18. The tool hook 56 may then be manipulated to engage the spring convolution chosen on opposite sides by its hooked ends 64 and 66. Support member 68 may then be moved along the axis of shaft 28 until it is in the position shown in FIGURE 1 relative to the spring seat 22. Nut 84 may be threaded upwardly with base plate 78 during movement of the support member 68 so that the tool is in the position shown in FIGURE 1.

A suitable tool such as the wrench 34 is then engaged with the end 32 of the shaft 28 and the shaft is turned so that it threads through nut 84 to shorten the distance between nut 84 and hook 56. The forces exerted during this operation will cause the spring 18 to be compressed between the hook 56 and seat 22. The bearing 44 will permit the shaft 28 to turn easily within collar 30 so that the hook 56 does not tend to be threaded through the spring 18.

As the shaft is tightened, the convolution to which the hook 56 is attached will change its angularity relative to the axis of shaft 28 so that it is nearly perpendicular to the shaft. Hook 56 accommodates this change by pivoting about rivet 62, thereby maintaining the compressive forces in equal distribution at opposite sides of the convolution. Similarly, the angle of shaft 28 relative to the plane of seat 22 may change slightly during compression of the spring. The pivotal action of support member 68 on roller supports 80 and 82 will readily accommodate this change.

The tool may be sufficiently tightened to compress spring 18 so that it can be easily removed. The tool is particularly convenient to use since it does not require any assembly and disassembly by the operator during use. Also, parts of the tool will not become misplaced and cause delays which have been common with similar tools in the past.

What is claimed is:

1. A coil spring compression tool for compressing a coil spring in an automobile suspension wherein the coil spring is received between an upper spring retainer and an apertured lower spring retainer, said tool comprising an elongated threaded bolt having a collar longitudinally secured to one end and rotatable relative thereto, a clevis secured to said collar, a centrally pivoted hook member pivotally secured to said clevis and having a spring convolution hook formed at each end, an annular support member loosely received on said bolt and engageable with said lower spring retainer when said bolt is extended into the coil spring and said hook engaged with opposite sides of a spring convolution, a base plate received on said bolt and pivotally supporting said support member, and a threaded member threadedly received on said bolt and non-rotatably engaging said base plate opposite said support member whereby said bolt may be turned in one direction to compress the coil spring between said support member and said hook with said hook pivoting as the compressed convolution closes to maintain substantially equal compressive forces on both hook ends and said support member pivoting to maintain equal distribution of the compression forces acting thereon.

2. A tool for use in compressing coil springs of the character utilized in automobile wheel suspensions, said tool comprising a threaded shaft extendable through a coil spring and having a centrally pivoted double ended coil spring hook pivotally secured to one end thereof for engaging opposite sides of a spring convolution, a support member adapted to be operatively connected with one end of the coil spring and pivotably received on said shaft, and threaded holding means threadedly received on said shaft and engageable with said support member to move said support member and said hook toward each other when said shaft is rotated in one direction to compress the coil spring, said pivoted hook and said pivotable support member remaining in full operative force transmitting connection with the spring during compression thereof by said tool.

3. A tool for compressing a coil spring disposed between an upper retainer and a lower retainer, said tool comprising an elongated threaded bolt having wrench receiving means on one end thereof and a pivot secured to the other end thereof, a member pivotably secured to said pivot for pivotal movement on the plane containing the bolt axis and having a spring coil hook formed at either end thereof or opposite sides of said pivot, a nut threadedly disposed on said bolt, a base plate intermediate said pivot and said nut and receiving said bolt therethrough and engageable with said nut and having pivot roller supports thereon on opposite sides of said bolt and extending toward said pivot, and a lower retainer support member having pivot rollers thereon received in said pivot roller supports, said support member receiving said bolt therethrough with substantial clearance to permit pivotal movement of said support member.

References Cited in the file of this patent

UNITED STATES PATENTS

| | | |
|---|---|---|
| 1,231,254 | Hancock | June 26, 1917 |
| 1,378,463 | Johnson | May 17, 1921 |
| 2,789,342 | Pouell | Apr. 23, 1957 |
| 2,861,329 | Bishman | Nov. 25, 1958 |